United States Patent
Fujimoto et al.

(10) Patent No.: US 6,383,103 B1
(45) Date of Patent: May 7, 2002

(54) HYDRAULIC TENSIONER

(75) Inventors: Nobuyuki Fujimoto; Tadasu Suzuki, both of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/513,732

(22) Filed: Feb. 16, 2000

(30) Foreign Application Priority Data

Feb. 18, 1999 (JP) .......................................... 11-040626

(51) Int. Cl.⁷ ................................................ F16H 7/08
(52) U.S. Cl. ...................................... 474/110; 474/109
(58) Field of Search ................................. 474/101, 103, 474/109, 110, 111, 135, 138, 140

(56) References Cited

U.S. PATENT DOCUMENTS

| | | | | |
|---|---|---|---|---|
| 4,657,524 A | * | 4/1987 | Okabe | 474/110 |
| 4,772,251 A | * | 9/1988 | Goppelt et al. | 474/101 |
| 4,881,927 A | * | 11/1989 | Suzuki | 474/110 |
| 4,911,679 A | * | 3/1990 | Inoue et al. | 474/110 |
| 4,997,411 A | * | 3/1991 | Breon et al. | 474/110 |
| 5,658,212 A | * | 8/1997 | Meurer et al. | 474/110 |
| 5,713,809 A | * | 2/1998 | Yamamoto et al. | 474/110 |
| 5,718,650 A | * | 2/1998 | Smith et al. | 474/110 |
| 5,833,563 A | * | 11/1998 | Takeda et al. | 474/138 |
| 5,879,256 A | * | 3/1999 | Tada | 474/110 |
| 5,913,742 A | * | 6/1999 | Nakamura et al. | 474/110 |
| 5,935,031 A | * | 8/1999 | Tada | 474/110 |
| 5,967,920 A | * | 10/1999 | Dembosky et al. | 474/109 |
| 5,993,342 A | * | 11/1999 | Wigsten et al. | 474/110 |
| 6,036,612 A | * | 3/2000 | Katogi et al. | 474/110 |
| 6,126,563 A | * | 10/2000 | Simpson | 474/110 |
| 6,193,623 B1 | * | 2/2001 | Koch et al. | 474/110 |

FOREIGN PATENT DOCUMENTS

| | | | |
|---|---|---|---|
| DE | 36 09 232 A1 | 10/1986 | |
| DE | 36 39 389 A1 | 5/1988 | |
| DE | 38 24 555 C1 | 7/1989 | |
| DE | 39 22 037 A1 | 1/1991 | |
| DE | 94 09 155 U1 | 11/1995 | |
| DE | 196 32 383 A1 | 2/1997 | |
| EP | 0 952 375 A2 | 10/1999 | |
| GB | 1 481 280 | 7/1977 | |
| JP | 62-159845 | * 7/1987 | ............ F16H/07/08 |
| JP | 63-120949 | * 5/1988 | ............ F16H/07/12 |
| JP | 06-137389 | * 5/1994 | ............ F16H/07/08 |

\* cited by examiner

Primary Examiner—Thomas R. Hannon
Assistant Examiner—Vicky A. Johnson
(74) Attorney, Agent, or Firm—Dann, Dorfman, Herrell and Skillman, P.C.; Henry H. Skillman

(57) ABSTRACT

A hydraulic tensioner includes a relief valve mechanism assembled in a plunger and held in fluid communication with a high-pressure oil chamber defined between a housing and the plunger which is slidably inserted in a plunger accommodation bore in the housing with a tip portion projecting therefrom. The relief valve mechanism is composed of a cup-shaped orifice member having an orifice formed in an outer circumferential surface thereof, and a relief valve assembled in the cup-shaped orifice member. The relief valve includes a cup-shaped sleeve slidably received in the orifice member, a spring urging the sleeve toward the high-pressure chamber, and a discharge port normally closed by the sleeve and adapted to be opened when the sleeve is displaced against the force of the spring. The thus constructed relief valve mechanism is small in size and capable of achieving downsizing of the hydraulic tensioner.

8 Claims, 4 Drawing Sheets

HYDRAULIC TENSIONER

BACKGROUND OF THE INVENTION

1. Field of the Invention

The present invention relates to a hydraulic tensioner used for applying an appropriate tension to a timing belt or a timing chain of a vehicle engine.

2. Description of the Related Art

Conventionally, a timing belt or a timing chain is used in a drive system for transmitting rotational motion from a crankshaft to a camshaft of an automobile engine, and a hydraulic tensioner is widely used to suppress vibration, which would otherwise occur in the timing belt or chain when the timing belt or chain travels, and to maintain a proper tension in the timing belt or chain.

FIG. 4 schematically illustrates a chain transmitting device for an engine in which a hydraulic tensioner is used. The hydraulic tensioner 41 is mounted on an engine body on the slack side of a chain (timing chain) 62. The chain 62 is fitted around and extends between a driving sprocket 59 rotated by a crankshaft 58 of the engine and a driven sprocket 61 fixed on a camshaft 60.

The hydraulic tensioner 41 includes a plunger 43 projecting from the front face of a tensioner housing 42 such that the plunger 43 can undergo reciprocating motion. A tip portion of the plunger 43 presses the rear side of a tension lever 64 at a position near the free end thereof. The tension lever 64 is pivotally supported on the engine body by means of a support shaft 63. Through such an arrangement, a shoe surface 65 of the tension lever 64 is brought into slidable contact with the slack side of the chain 62 to thereby apply tension to the chain 62.

Most conventional hydraulic tensioners have a relief valve or an orifice provided alone. The hydraulic tensioner equipped with only the relief valve has a problem that air staying in the plunger cannot escape until the air pressure goes up to a predetermined pressure. On the other hand, the hydraulic tensioner equipped with the orifice alone would encounter a problem that the hydraulic pressure is likely to becomes extremely high or extremely low, making it difficult to achieve an accurate pressure setting. To deal with these problems, attempts have been made to provide hydraulic tensioners equipped with both a relief valve and an orifice.

One example of the proposed hydraulic tensioners is shown in FIG. 5, which includes a relief valve and an orifice. provided seperately, as discussed below.

The hydraulic tensioner 41 includes a plunger 43 slidably mounted in a housing 42 so that a high-pressure oil chamber 44 is defined between the housing 42 and an inner part of the plunger 43. The plunger 43 is urged in a direction to project from the housing 42 by means of a spring 45. A tip end of the plunger 43 is provided with an end plug 55.

Between the housing 42 and the high-pressure oil chamber 44, there is provided a check valve mechanism 47 including a check ball 46. The check valve mechanism 47 permits oil to flow into the high-pressure chamber 44 while blocking the oil from flowing out from the high-pressure oil chamber 44. The high-pressure oil chamber 44 is always filled with the oil which is supplied to an oil supply passage 48 from an oil supply source (not shown) via the check valve mechanism 47.

The plunger 43 is also formed with a secondary oil chamber 50 communicating with the high-pressure oil chamber 44 through an oil passage 49. A sleeve 51 is slidably received in the secondary oil chamber 50 and urged in an axial inward direction by a spring 52. The plunger 43 further has a discharge port 53 normally closed by the sleeve 51. The discharge port 53 is opened when the sleeve 51 is displaced in an axial outward direction past the discharge port 53 against the force of the spring 52. The spring-loaded sleeve 51 assembled in the plunger 43 forms a relief valve 54.

The housing 42 of the tensioner 41 further includes an orifice member 56 having a peripheral helical orifice 56A designed to communicate with an upper part of the high-pressure oil chamber 44 for allowing the leakage of air or oil from the high-pressure oil chamber 44.

While the chain 43 is running, the plunger 43 of the foregoing conventional hydraulic tensioner 41 may be subjected to a force or load applied from the chain 62 in a direction to move the plunger 43 backward against the force of the spring 45 whereupon the hydraulic pressure in the high-pressure oil chamber 47 increases. In this instance, air or oil leaks from the orifice 56A of the orifice member 56 to thereby absorb an impact force applied to the plunger 43. At the same time, a pressure rise is developed in the pressure in the secondary oil chamber 50, which forces the sleeve 51 of the relief valve 54 to gradually move backward away from the secondary oil chamber 50 against the force of the spring 52. As the pressure in the secondary oil chamber 50 further increases, the sleeve 51 is caused to move backward past the discharge port 53 whereupon the discharge port 53 is opened, allowing the oil to flow out from the secondary oil chamber 50 to thereby relieve the pressure in the high-pressure oil chamber 44.

FIG. 6 shows in cross section another example of the conventional hydraulic tensioner which includes a relief valve and an orifice member provided separately.

The hydraulic tensioner 41' is equipped with an oil supply passage 48 and a check valve mechanism 47, a plunger 43', a high-pressure oil chamber 44' and an orifice member 56 that are similar to those of the tensioner 41 shown in FIG. 5. The conventional tensioner 41' is substantially the same in function and operation as the conventional tensioner shown in FIG. 5 but differs from the latter in the respective positions of the relief valve 54 and orifice member 56.

More specifically, the relief valve 54 is disposed inside the housing 42 and located above the high-pressure oil chamber 44. The orifice member 55 is provided at a tip end of the plunger 42.

The operation and function of the hydraulic tensioner 41' are the same as those of the hydraulic tensioner 41 of FIG. 5 and a further description thereof can, therefore, be omitted.

As discussed above, in the foregoing examples of the conventional hydraulic tensioners, the relief valve 54 which is adapted to be opened to release the pressure of the high-pressure oil chamber beyond a predetermined limit, and the orifice member 56 which is designed to vent air or leak the oil from the high-pressure oil chamber to thereby absorb an impact force applied to the plunger are provided separately. Thus, it has been conventionally impossible to integrate these two functionally different components into a single unit. Since the relief valve and the orifice member are arranged separately, the conventional hydraulic tensioners are relatively large in size and hence require a large space for installation, and are expensive to manufacture.

SUMMARY OF THE INVENTION

It is accordingly a general object of the present invention to solve the foregoing problems associated with the prior art.

A more specific object of the present invention is to provide a hydraulic tensioner including a relief valve and an orifice member integrated into a single operating unit which is capable of achieving both a pressure-releasing function and a fluid-leaking function with respect to a high-pressure oil chamber, occupies only a small space in the housing and hence is contributive to the downsizing of the tensioner, and adds to reduction of the manufacturing cost of the tensioner.

To achieve the foregoing objects, there is provided, according to the present invention, a hydraulic tensioner comprising: a tensioner housing having a plunger accommodation bore formed therein, a plunger slidably fitted into the plunger accommodation bore of the tensioner housing and urged by a spring such that a tip portion of the plunger is projected to the exterior of the plunger accommodation bore, the plunger having a hollow portion opening to an end face of the plunger which faces a bottom wall of the plunger accommodation bore, there being a high-pressure oil chamber defined between the housing and the hollow portion of the plunger and filled with oil; a check valve mechanism equipped with a check ball for permitting the passage therethrough of the oil in only one direction from the exterior of the housing into the high-pressure oil chamber; and a relief valve mechanism arranged in fluid communication with the high-pressure oil chamber. The relief valve mechanism includes a generally cup-shaped orifice member having a peripheral orifice formed in an outer circumferential surface of the orifice member for allowing the oil to leak out from the high-pressure oil chamber, and a relief valve integrally assembled with the orifice member and solely operable to release the oil from the high-pressure oil chamber when the pressure in the high-pressure oil chamber exceeds a predetermined limit. The relief valve includes a cup-shaped sleeve slidably mounted in the hollow cylindrical orifice member, a sleeve spring urging the sleeve in a direction toward the high-pressure oil chamber, and a discharge port formed in a sidewall of the orifice member. The discharge port is normally closed by the sleeve and adapted to be opened when the sleeve is displaced in a direction away from the high-pressure oil chamber against the force of the sleeve spring.

With this arrangement, when the plunger is subjected to a force or load applied from a running chain in a direction to force the plunger backward against the force of the spring, the pressure in the high-pressure oil chamber increases as the check valve mechanism blocks the oil from flowing out from the high-pressure oil chamber. With this pressure rise developed in the high-pressure chamber, air or oil in the high-pressure oil chamber leaks from the peripheral orifice, to thereby absorb a shock force applied to the plunger. The pressure rise in the high-pressure oil chamber is transmitted to secondary oil chamber in which the sleeve is slidably received. When the hydraulic pressure applied to the sleeve exceeds the force of the sleeve spring, the sleeve starts moving backward against the force of the sleeve spring. A further increase in the pressure in the secondary oil pressure causes the sleeve to move backward past the discharge port whereupon the discharge port is opened, allowing the oil to flow out from the secondary oil chamber to thereby release the pressure of the high-pressure oil chamber. The oil leaked from the peripheral orifice and the oil flow out from the discharge port are discharged from the housing through a discharge hole.

In one preferred form of the present invention, the relief valve mechanism is assembled in a second hollow portion of the plunger formed contiguously with the hollow portion and having one end opening to a tip end of the plunger. The plunger includes an end plug fitted in the second hollow portion to close the one end thereof, and the end plug has a discharge hole for discharging the oil therefrom to the exterior of the tensioner after the oil has leaked from the orifice or has been released from the discharge port.

In another preferred form of the present invention, the relief valve mechanism is assembled in a mounting hole formed in the housing and having one end connected to the high-pressure oil chamber. The housing includes an end plug fitted in the mounting hole to close the other end thereof, and the end plug has a discharge hole for discharging the oil therefrom to the exterior of the tensioner after the oil has leaked from the orifice or has been released from the discharge port. For smooth and reliable venting of air from the high-pressure oil chamber, it is preferable that the relief valve mechanism is disposed above the high-pressure oil chamber.

Preferably, the cup-shaped orifice member has a bottom wall at an end thereof facing the high-pressure oil chamber, an oil passage formed in the bottom wall, and a secondary oil chamber formed interiorly of the cut-shaped orifice member and communicating with the high-pressure oil chamber through the oil passage. The cup-shaped sleeve is slidably received in the secondary oil chamber.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENTS

Certain preferred structural embodiments of the present invention will next be described with reference to the drawings.

Figure 1:
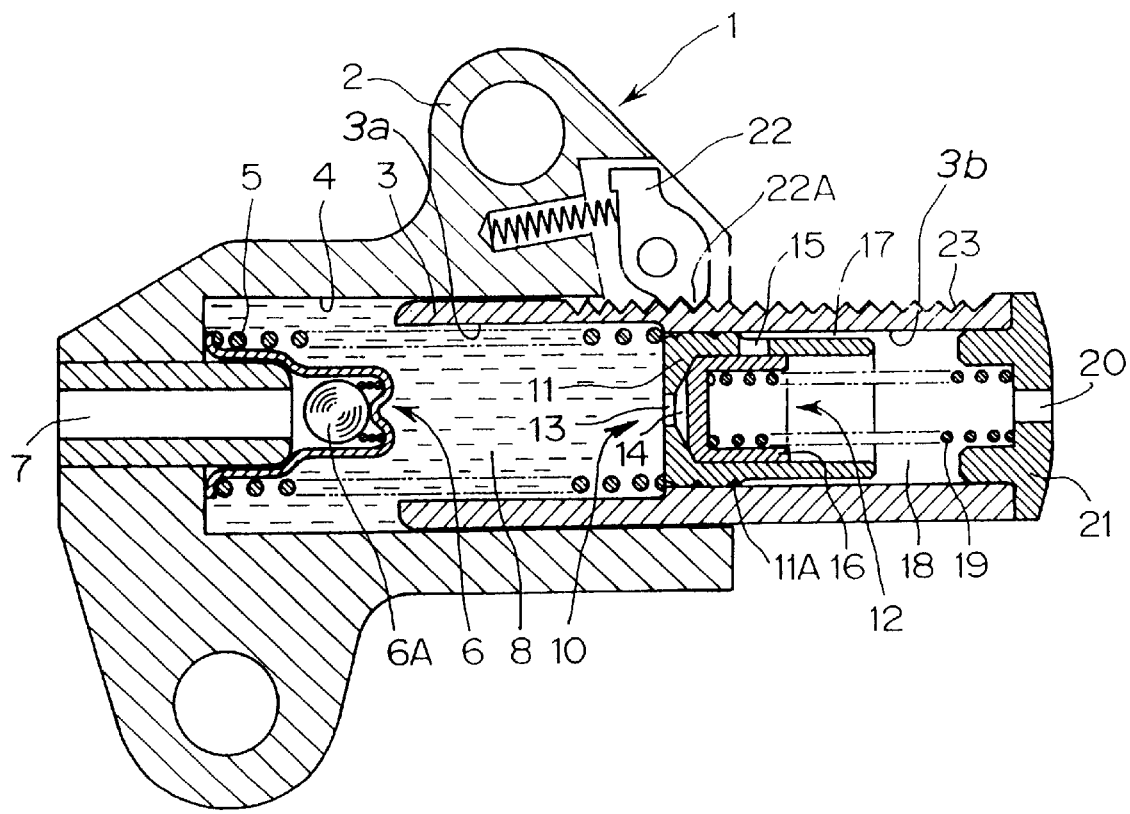
FIG. 1 is a cross-sectional view of a hydraulic tensioner according to a first embodiment of the present invention.

Referring now to FIG. 1, there is shown a hydraulic tensioner 1 according to a first embodiment of the present invention. The tensioner 1 includes a tensioner housing having a plunger accommodation bore 4 formed therein, and a plunger 3 slidably fitted in the plunger accommodation bore 4 such that it may undergo reciprocating motion. The plunger 3 takes the form of a hollow cylinder and includes a first hollow portion 3a and a second hollow portion 3b separated by an annular step. The first hollow portion 3a has a larger inside diameter than the second hollow portion 3b. The first hollow portion 3a opens to the end surface of the plunger 3 which faces the bottom of the plunger accommodation bore 4. A plunger spring 5 is inserted into the first hollow portion 3a and acts between the bottom of the plunger accommodation bore 4 and that of the first hollow portion 3a (i.e., the annular step between the first and second hollow portions 3a and 3b) to urge the plunger 3 at all times in such a direction that a tip portion of the plunger 3 is projected from the housing 2.

A check valve mechanism 6 equipped with a check ball 6A is provided at the bottom of the plunger accommodation bore 4. The check valve mechanism 6 allows passage therethrough of oil in only one direction from an oil supply passage 7 to a high-pressure oil chamber 8 while blocking reverse flow of the oil. The oil supply passage 7 is formed in the housing 2, and the high-pressure oil chamber 8 is defined between the plunger accommodation bore 4 of the housing 2 and the first hollow portion 3a of the plunger 3.

Figure 2:
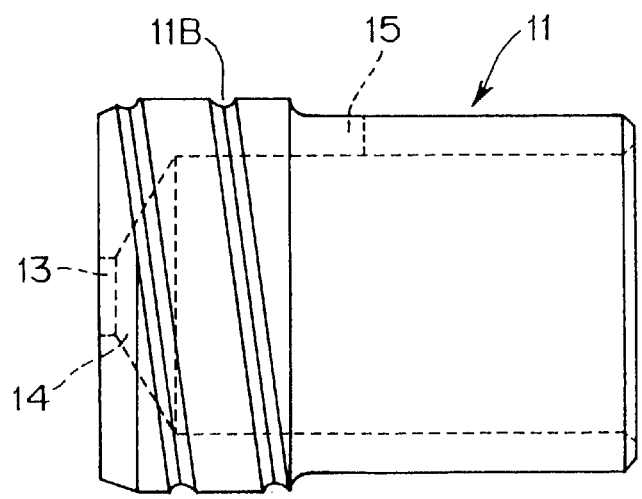
FIG. 2 is an enlarged front elevational view of an orifice member of the hydraulic tensioner.

A relief valve mechanism 10 is assembled in the second hollow portion 3b of the plunger 3 located on the tip end side of the plunger 3. The relief valve mechanism 10 is formed jointly by an orifice member 11 and a relief valve 12. The orifice member 11 is generally cup-shaped having a bottom wall at one end thereof. The bottom wall of the orifice member 11 faces the high-pressure oil chamber 8 and has an oil passage 13 formed therein. The cup-shaped orifice member 11 further has a secondary oil chamber 14 formed interiorly thereof and communicating with the high-pressure oil chamber 8 through the oil passage 13, and a discharge port 15 formed in a sidewall of the cup-shaped orifice member 11 and connected at one end to the secondary oil chamber 14 so that the oil in the secondary oil chamber 14 may flow out from the discharge port 15 to the exterior of the orifice member 11, as described later. As shown in FIG. 2, the orifice member 11 has a helical groove 11b formed in an outer circumferential surface of the cup-shaped orifice member 11 and extends from the closed end toward an open end of the cup-shaped orifice member 11. The helical groove 11B forms an orifice 11A through which air and the oil may leak out from the high-pressure oil chamber 8, as described later. The sidewall of the cup-shaped orifice member 11 has a large-diameter portion located on the closed end side thereof and a small-diameter portion located on the open end side thereof and having a smaller outside diameter than the large-diameter portion. The helical groove 11B is formed in the large-diameter portion, and the discharge port 15 is formed in the small-diameter portion.

The secondary oil chamber 50 is formed interiorly of the orifice member 11 and slidably receives therein a sleeve 16. The sleeve 16 is generally cup-shaped and has a closed end facing the bottom wall of the orifice member 11. When the oil flows from the high-pressure oil chamber 8 through the oil passage 13 into the secondary oil chamber 14, the sleeve 16 is displaced to the right in FIG. 1 within the secondary oil chamber 14.

The orifice member 11 is press-fitted in the second hollow portion 3b of the plunger 3 from the tip end side of the plunger 3 in such a manner that an outer surface of the bottom wall of the cup-shaped orifice member 11 is in flush with the annular step between the first and second hollow portions 3a and 3b of the plunger 3. With the orifice member 11 thus press-fitted in the second hollow portion 3b of the plunger 3, the orifice 11A is defined between the outer circumferential surface of the cup-shaped orifice member 11 and an inner circumferential surface of the second hollow portion 3b of the plunger 3. At the same time, the second hollow portion 3b of the plunger 3 and the reduced-diameter sidewall portion of the cup-shaped orifice member 11 define therebetween an annular space 17. Thus, the oil leaked out from the orifice 11A and the oil released from the discharge port 15 are guided to pass through through the annular space 17. The annular space 17 communicates with an oil reservoir 18 formed inside the second hollow portion 3b of the plunger 3.

The sleeve 16 which is slidably received in the secondary oil chamber 14 of the orifice member 11 is urged at all times toward the high-pressure oil chamber 8 by means of a sleeve spring 19 disposed in the oil reservoir 18. The sleeve spring 19 acts between the sleeve 16 and an end plug 21 attached to the tip end of the plunger 3 to close one end of the second hollow portion 3b. The end plug 21 has a discharge hole 20 for discharging oil from the oil reservoir 18.

The hydraulic tensioner 1 further has an anti-retraction mechanism for preventing the plunger 3 from moving backward. The anti-retraction mechanism includes a ratchet 22 pivotally supported on the housing 2, and a row of ratchet teeth 23 formed on an outer circumferential surface of the plunger 3. The ratchet 22 has a pair of locking pawls 22A normally held in mesh with mating ones of the rachet teeth 23 under the bias of a ratchet spring (not designated) so that the plunger 3 is permitted to move in the forward direction but prevented from moving backward. The anti-retraction mechanism may be omitted when the case allows.

In the hydraulic tensioner 1 of the foregoing construction, the relief valve 12 and the orifice member 11 are integrally assembled together to form a single unit. The hydraulic tensioner operates as follows.

Figure 4:
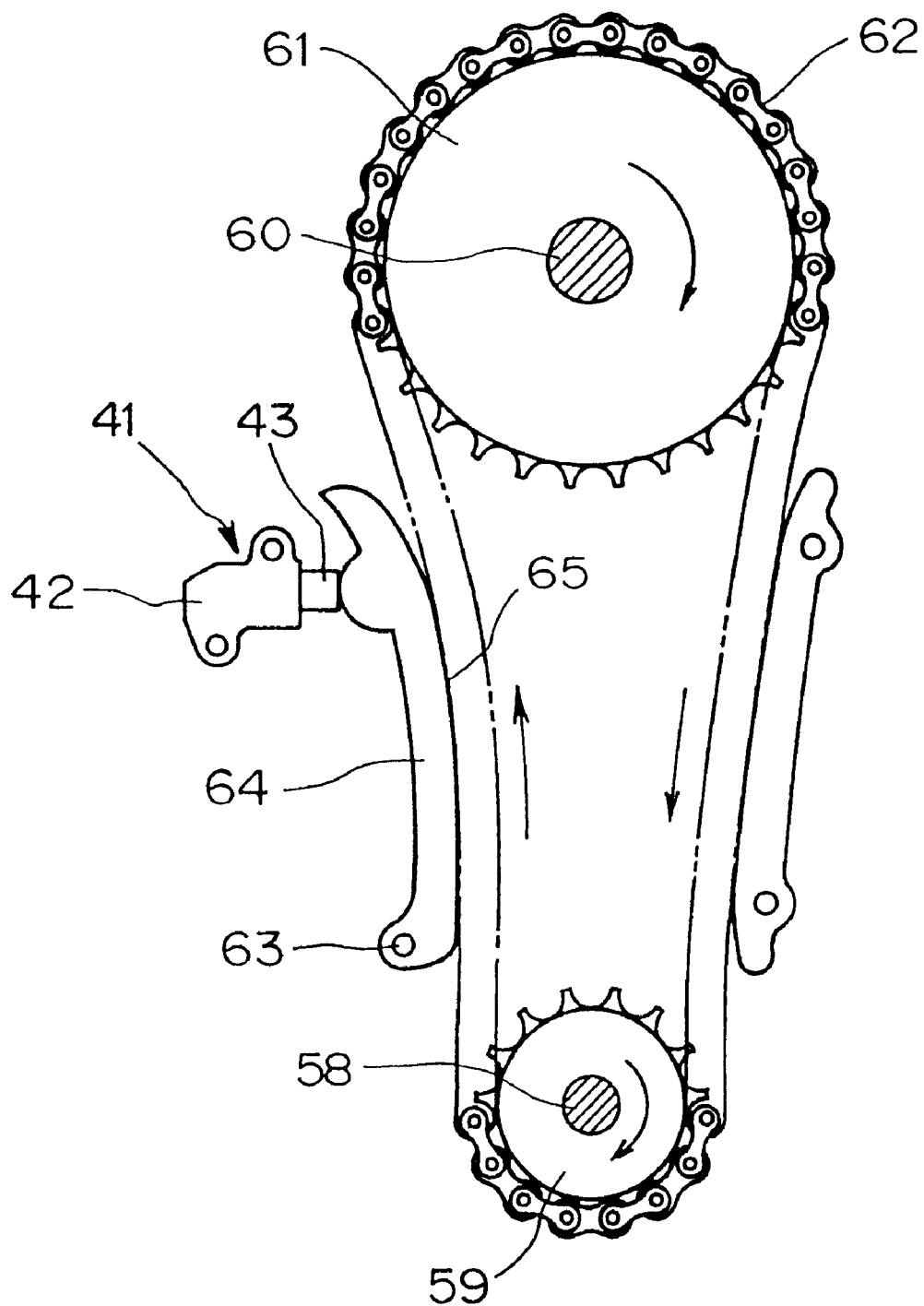
FIG. 4 schematically illustrates an application of a hydraulic tensioner.
Figure 5:
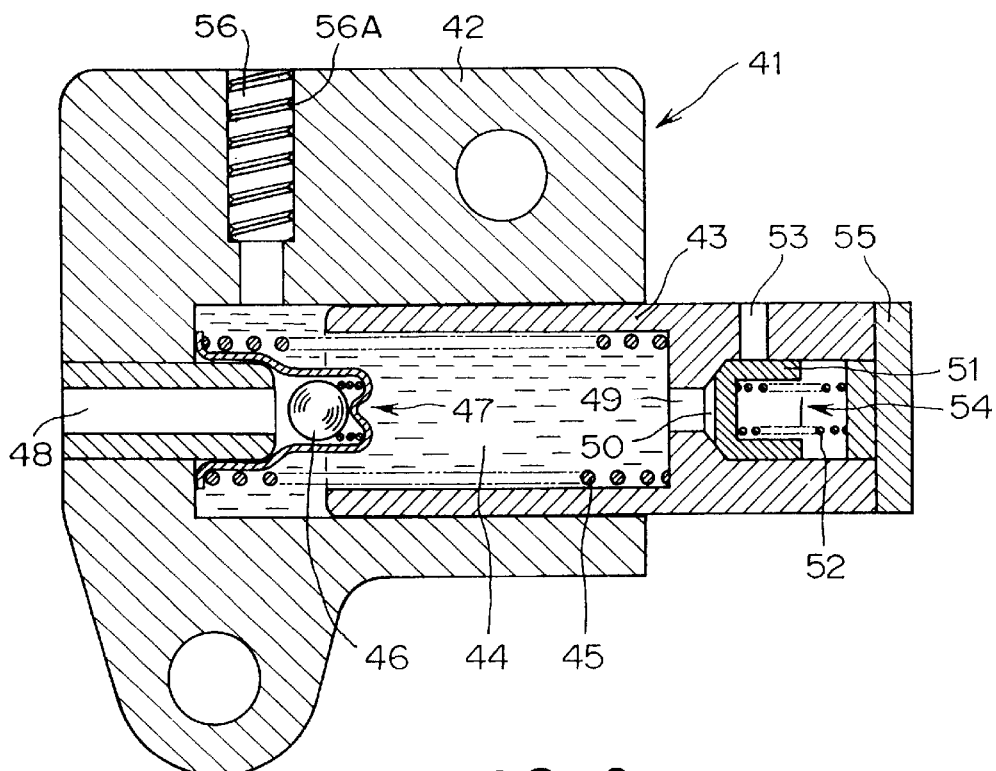
FIG. 5 is a cross-sectional view showing an example of conventional hydraulic tensioners.
Figure 6:
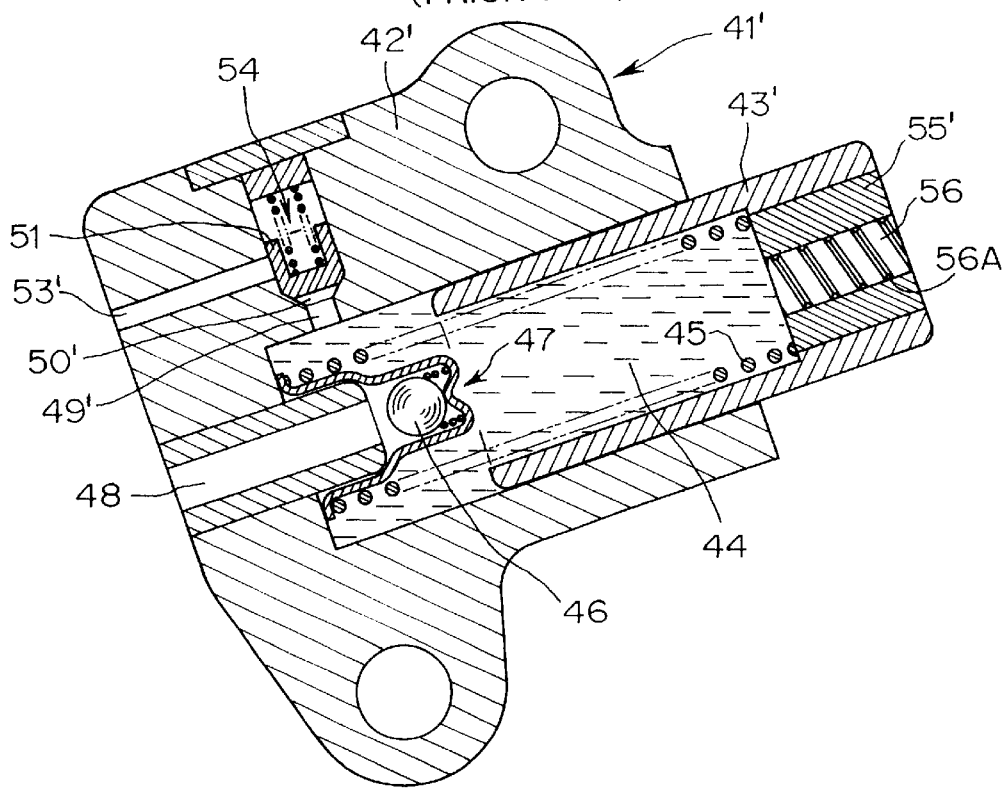
FIG. 6 is a view similar to FIG. 5 but showing another conventional hydraulic tensioner.

When the plunger 3 of the hydraulic tensioner 1 is subjected to a force or load including an impact force which may be applied from a chain (not shown but similar to the one 62 shown in FIG. 4) in a direction opposite to the direction of force of the plunger spring 5 while the chain is running, the pressure in the high-pressure oil chamber 8 increases as the check valve mechanism 6 continuously blocks passage of oil from the high-pressure chamber 8 to the exterior of the housing 2. In this instance, however, air or the oil in the high-pressure oil chamber 8 leaks out from the orifice 11A formed by the helical groove 11B in the orifice member 11, thereby absorb the impact force applied to the plunger 3. A pressure rise developed in the high-pressure oil chamber 8 is transmitted to the secondary oil chamber 14 in which the sleeve 16 is slidably received. When the hydraulic pressure acting on the sleeve, which is proportional to the sectional area of the sleeve 16, exceeds a biasing force of the sleeve spring 19, the sleeve 16 starts moving backward (to the right in FIG. 1). A further pressure rise in the secondary oil chamber 14 causes the sleeve 16 to move backward past the discharge port 15 whereupon the discharge port 15 is opened, allowing the oil to flow out from the secondary oil chamber 14. With this outflow of the oil, the pressure of the high-pressure oil chamber 8 is released. Thus, the high-pressure oil chamber 8 is protected from being subjected to undue high pressure. The oil which has leaked out from the orifice 11A and the oil which has been released from the discharge port 15 subsequently pass through the annular space 17, then enter the oil reservoir 18, and finally are discharged from the discharge hole 20 to the exterior of the housing 2. The discharged oil is used for lubricating the chain and the surrounding parts.

In the hydraulic tensioner 1, since the relief valve mechanism 10 is composed a relief valve 12 assembled or built in the orifice member 11 as an integral part of the orifice member 11, the overall size of the hydraulic tensiner is considerably smaller than that of the conventional tensioners. By virtue of the relief valve mechanism 10, the high-pressure oil chamber 8 is protected from being subjected to undue high pressure. Additionally, the oil leaked out from the orifice member 11 and the oil released from the relief valve 12 are discharged from the discharge hole 20 and subsequently used for lubrication of the chain.

Figure 3:
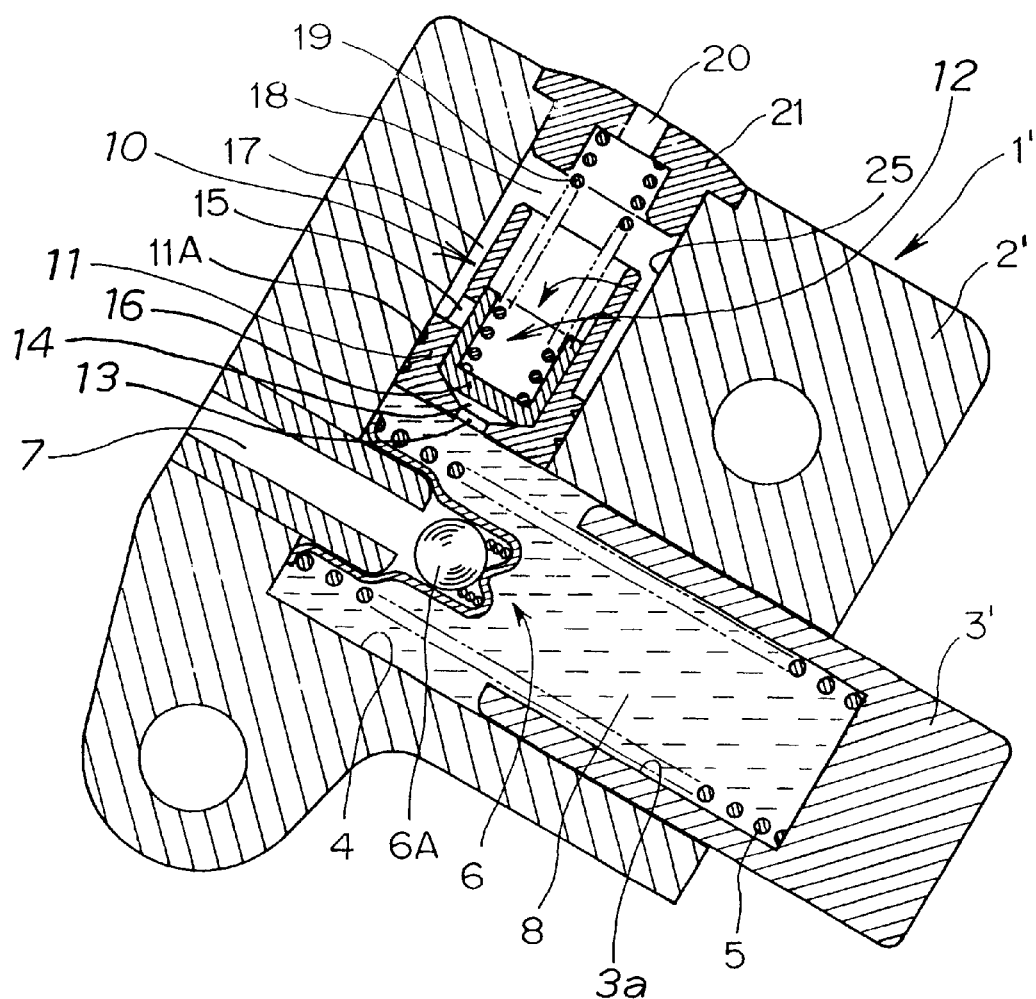
FIG. 3 is a cross-sectional view of a hydraulic tensioner according to a second embodiment of the present invention.

FIG. 3 shows in cross section a hydraulic tensioner 1' according to a second embodiment of the present invention.

In FIG. 3 these parts which are like or corresponding to those shown in FIG. 1 are designated by the same reference characters.

As shown in FIG. 3, the hydraulic tensioner 1' includes a relief valve mechanism 10 is mounted or otherwise assembled in a tensioner housing 2 such that the relief valve mechanism 10 is in fluid communication with a high-pressure oil chamber 8 and located above the high-pressure oil chamber 8. The relief valve mechanism 10 has the same construction as the relief valve mechanism 10 of the embodiment shown in FIG. 1.

The housing 2 has a plunger accommodation bore 4 into which a plunger 3' is slidably inserted for reciprocating movement relative to the housing 2. The plunger 3' has a hollow portion (not designated) opening toward the bottom of the plunger accommodation bore 4 of the housing 2. A plunger spring 5 is partly received in the hollow portion of the plunger 3' and acts between the bottom of the plunger accommodation bore 4 and the bottom of the plunger hollow portion to urge the plunger 3' at all times in such a direction that a tip portion of the plunger 3' is projected from the housing 2.

Disposed at the bottom of the plunger accommodation bore 4 is a check valve mechanism 6 equipped with a check ball 6A. The check valve mechanism 6 permits passage of oil in only one direction from an oil passage 7 formed in the housing 2 to the high-pressure oil chamber 8 and blocks flow of the oil in the opposite direction. The high-pressure oil chamber 8 is defined between the housing 2 and the hollow portion of the plunger 3' and is always filled with oil supplied thereinto via the oil supply passage 7.

The relief valve mechanism 10 is located above the high-pressure oil chamber 8 as mentioned previously. The relief valve mechanism 10 is composed of an orifice member 11 and a relief valve 12 assembled together into a single unit. The orifice member 11 is press-fitted in a mounting hole 25 formed in the housing 2. The mounting hole 25 has one end connected to the high-pressure oil chamber 8. The housing 2 includes an end plug 21 fitted in the mounting hole 25 to close the other end thereof. The end plug 21 has a discharge hole 20 for discharging oil from a secondary oil chamber 14. In addition to the construction, operation and function of the relief valve mechanism 10 are the same as those mentioned above with respect to the embodiment shown in FIG. 1, and a further description thereof can, therefore, be omitted.

Since the relief valve mechanism 10 has an integral structure composed of the relief valve 12 assembled or built in the orifice member 11, the overall size of the hydraulic tensioner 1' is relatively small. Additionally, since the relief valve mechanism 10 is disposed above the high-pressure oil chamber 8 in fluid communication with the high-pressure oil chamber 8, venting of staying air from the high-pressure oil chamber 8 can be achieved smoothly and reliably via an orifice 11A formed in the orifice member 11.

As described above, an orifice member 11, which is capable of gradually decreasing the pressure in the high-pressure oil chamber 8 when a pressure rise is developed in the high-pressure oil chamber 8, and a relief valve 12, which is capable of releasing undue high pressure from the high-pressure oil chamber 8, are integrally assembled together to form a single relief valve mechanism 10. The hydraulic tensioner 1, 1' including such integrated relief valve mechanism 10 is compact and can be manufactured at a low cost as compared to the conventional hydraulic tensioners in which a relief valve and an orifice member are arranged separately.

In the case where the relief valve mechanism disposed above the high-pressure oil chamber, the plunger may have a simple structure having a closed tip end. This may lead to a reduction of the manufacturing cost of the plunger. Additionally, the plunger can prevent leakage of oil from the tip end thereof.

Alternatively, in the case of the relief valve assembled in the plunger, the plunger has a hollow cylindrical shape and a tip end of the hollow plunger is closed by an end plug. The end plug has a discharge hole so that the oil leaked out from an orifice in the orifice member and the oil released from a discharge port of the relief valve can be discharged from the discharge port to the exterior of the housing. The discharged oil can automatically be used for lubrication of the chain as the plunger is held in contact with the chain via a shoe member (not shown). The discharge hole formed in the end plug at the tip end of the plunger makes it unnecessary to provide a separate oil supply hole which is conventionally required for lubrication of the chain. This may add to the reduction of manufacturing cost of the hydraulic tensioner.

Obviously, numerous modifications and variations of the present invention are possible in light of the above teachings. It is therefore to be understood that within the scope of the appended claims, the present invention may be practiced otherwise than as specifically described herein.

What is claimed is:

1. A hydraulic tensioner comprising:
   a tensioner housing having a plunger accommodation bore formed therein, said bore having an open top and a bottom wall;
   a single plunger slidably fitted into said plunger accommodation bore of said tensioner housing and urged by a spring such that a tip portion of said plunger is projected to the exterior of said plunger accommodation bore through said open top, said plunger having a hollow portion opening to an end face of said plunger which faces said bottom wall of said plunger accommodation bore, there being a high-pressure oil chamber defined between said housing and said hollow portion of said plunger and filled with oil;
   a check valve mechanism disposed at the bottom of said plunger accommodation bore equipped with a check ball for permitting the passage therethrough of the oil in only one direction from the exterior of said housing into said high-pressure oil chamber; and
   a relief mechanism arranged in fluid communication with said high-pressure oil chamber,
   wherein said relief valve mechanism includes a separate generally cup-shaped orifice member having a peripheral helical groove having one end in fluid communication with said high-pressure oil chamber, said groove being formed in an outer circumferential surface of said orifice member providing a peripheral orifice having said one end open to said high-pressure oil chamber and the other end open for allowing the oil and air to leak out from said high-pressure oil chamber, and a relief valve integrally assembled with said orifice member and solely operable to release the oil from said high-pressure oil chamber when the pressure in said high-pressure oil chamber exceeds a predetermined limit, and
   wherein said relief valve includes a cup-shaped sleeve slidably mounted in the interior of said cup-shaped orifice member, a sleeve spring urging said sleeve in a direction toward said high-pressure oil chamber, and a discharge port formed in a sidewall of said orifice member, said discharge port being normally closed by said sleeve and adapted to be opened when said sleeve is displaced in a direction away from said high-pressure oil chamber against the force of said sleeve spring.

2. A hydraulic tensioner according to claim 1, wherein said relief valve mechanism is assembled in a second hollow portion of said plunger formed contiguously with said hollow portion and having one end opening to a tip end of said plunger, and said plunger includes an end plug fitted in said second hollow portion to close said one end thereof, said end plug having a discharge hole for discharging the oil therefrom to the exterior of said tensioner after the oil has leaked from said orifice or has been released from said discharge port.

3. A hydraulic tensioner according to claim 1, wherein said cup-shaped orifice member has a bottom wall at an end thereof facing said high-pressure oil chamber, an oil passage formed in said bottom wall, and a secondary oil chamber formed interiorly of said cup-shaped orifice member and communicating with said high-pressure oil chamber through said oil passage, said cup-shaped sleeve being slidably received in said secondary oil chamber.

4. A hydraulic tensioner according to claim 3, wherein said relief valve mechanism is assembled in a second hollow portion of said plunger formed contiguously with said hollow portion and having one end opening to a tip end of said plunger, and said plunger includes an end plug fitted in said second hollow portion to close said one end thereof, said end plug having a discharge hole for discharging the oil therefrom to the exterior of said tensioner after the oil has leaked from said orifice or has been released from said discharge port.

5. A hydraulic tensioner comprising:

a tensioner housing having a plunger accommodation bore formed therein, said bore having an open top and a bottom wall, and a mounting hole adjacent said bottom wall, a single plunger slidably fitted into said plunger accommodation bore of said tensioner housing and urged by a spring such that a tip portion of said plunger is projected to the exterior of said plunger accommodation bore through said open top, said plunger having a hollow portion opening to an end face of said plunger which faces said bottom wall of said plunger accommodation bore, there being a high-pressure oil chamber defined between said housing and said hollow portion of said plunger and filled with oil;

a check valve mechanism disposed at the bottom of said plunger accommodation bore equipped with a check ball for permitting the passage therethrough of the oil in only one direction from the exterior of said housing into said high-pressure oil chamber; and a relief valve mechanism assembled in said mounting hole, said mounting hole having one end connected to said high-pressure oil chamber, and said housing including an end plug fitted in said mounting hole to close the other end thereof, wherein said relief valve mechanism includes a separate generally cup-shaped orifice member having a peripheral orifice in fluid communication with said high-pressure oil chamber formed in an outer circumferential surface of said orifice member for allowing the oil to leak out from said high-pressure oil chamber, and a relief valve integrally assembled with said orifice member and solely operable to release the oil from said high-pressure oil chamber when the pressure in said high-pressure oil chamber exceeds a predetermined limit, and wherein said relief valve includes a cup-shaped sleeve slidably mounted in the interior of said cup-shaped orifice member, a sleeve spring urging said sleeve in a direction toward said high-pressure oil chamber, and a discharge port formed in a sidewall of said orifice member, said discharge port being normally closed by said sleeve and adapted to be opened when said sleeve is displaced in a direction away from said high-pressure oil chamber against the force of said sleeve spring, said end plug having a discharge hole (20) for discharging the oil therefrom to the exterior of said tensioner after the oil has leaked from said orifice or has been released from said discharge port.

6. A hydraulic tensioner according to claim 5, wherein said relief valve mechanism is disposed above said high-pressure oil chamber.

7. A hydraulic tensioner comprising:

a tensioner housing having a plunger accommodation bore formed therein, said bore having an open top and a bottom wall, and a mounting hole adjacent said bottom wall, a single plunger slidably fitted into said plunger accommodation bore of said tensioner housing and urged by a spring such that a tip portion of said plunger is projected to the exterior of said plunger accommodation bore through said open top, said plunger having a hollow portion opening to an end face of said plunger which faces said bottom wall of said plunger accommodation bore, there being a high-pressure oil chamber defined between said housing and said hollow portion of said plunger and filled with oil;

a check valve mechanism disposed at the bottom of said plunger accommodation bore equipped with a check ball for permitting the passage therethrough of the oil in only one direction from the exterior of said housing into said high-pressure oil chamber; and a relief valve mechanism assembled in said mounting hole, said mounting hole having one end connected to said high-pressure oil chamber, and said housing including an end plug fitted in said mounting hole to close the other end thereof, wherein said relief valve mechanism includes a separate generally cup-shaped orifice member having a bottom wall at one end facing said high pressure oil chamber, an oil passage formed in said bottom wall, a secondary oil chamber formed interiorly of said cup-shaped orifice member and communicating with said high-pressure oil chamber through said oil passage, a peripheral orifice in fluid communication with said high-pressure oil chamber formed in an outer circumferential surface of said orifice member for allowing the oil to leak out from said high-pressure oil chamber, and a relief valve integrally assembled with said orifice member and solely operable to release the oil from said high-pressure oil chamber when the pressure in said high-pressure oil chamber exceeds a predetermined limit, and wherein said relief valve includes a cup-shaped sleeve slidably mounted in said secondary oil chamber in the interior of said cup-shaped orifice member, a sleeve spring urging said sleeve in a direction toward said high-pressure oil chamber, and a discharge port formed in a sidewall of said orifice member, said discharge port being normally closed by said sleeve and adapted to be opened when said sleeve is displaced in a direction away from said high-pressure oil chamber against the force of said sleeve spring, said end plug having a discharge hole for discharging the oil therefrom to the exterior of said tensioner after the oil has leaked from said orifice or has been released from said discharge port.

8. A hydraulic tensioner according to claim 7, wherein said relief valve mechanism is disposed above said high-pressure oil chamber.

* * * * *